(12) United States Patent
Roy et al.

(10) Patent No.: US 11,326,110 B2
(45) Date of Patent: May 10, 2022

(54) PROCESS AND PLANT FOR PRODUCING HYDROCARBONS WITH REDUCED $CO_2$-FOOTPRINT AND IMPROVED HYDROGEN INTEGRATION

(71) Applicant: HALDOR TOPSØE A/S, Kgs. Lyngby (DK)

(72) Inventors: Rakesh Roy, Valby (DK); Nitesh Bansal, Noida (IN); Priyesh Thakker, Missouri City, TX (US); Thor Gallardo, Houston, TX (US)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 17/514,772

(22) Filed: Oct. 29, 2021

(65) Prior Publication Data

US 2022/0049166 A1    Feb. 17, 2022

Related U.S. Application Data

(63) Continuation of application No. PCT/EP2021/056085, filed on Mar. 10, 2021.

(30) Foreign Application Priority Data

Mar. 13, 2020 (EP) ..................................... 20162995

(51) Int. Cl.
  *C10G 45/02*  (2006.01)
  *B01D 3/14*   (2006.01)
  (Continued)

(52) U.S. Cl.
  CPC ............. *C10G 45/02* (2013.01); *B01D 3/143* (2013.01); *B01D 53/047* (2013.01);
  (Continued)

(58) Field of Classification Search
  CPC .......... C10G 1/002; C10G 1/10; C10G 45/02; C10G 47/00; C10G 65/12;
  (Continued)

(56) References Cited

U.S. PATENT DOCUMENTS 7,626,063 B2   12/2009  Ghonasgi et al.
8,324,438 B2   12/2012  Brandvold et al.
(Continued)

FOREIGN PATENT DOCUMENTS

CA      2718509 C      12/2009
EP    0 535 505 B1      7/1997
(Continued)

OTHER PUBLICATIONS

International Search Report and Written Opinion dated Jun. 2, 2021 in PCT/EP2021/056085.

(Continued)

*Primary Examiner* — Brian A McCaig
(74) *Attorney, Agent, or Firm* — Leydig, Voit & Mayer, Ltd.

(57) ABSTRACT

Process and plant for producing hydrocarbon products from a feedstock originating from a renewable source, where a hydrogen-rich stream and on off-gas stream comprising hydrocarbons is formed. A portion of the hydrogen-rich stream is used as a recycle gas stream in a hydroprocessing stage for the production of said hydrocarbon products, and another portion may be used for hydrogen production, while the off-gas stream is treated to remove its $H_2S$ content and used as a recycle gas stream in the hydrogen producing unit, from which the hydrogen produced i.e. make-up hydrogen, is used in the hydroprocessing stage. The invention enables minimizing natural gas consumption in the hydrogen producing unit as well as steam reformer size.

30 Claims, 2 Drawing Sheets

(51) Int. Cl.
| | |
|---|---|
| *B01D 53/047* | (2006.01) |
| *B01J 19/24* | (2006.01) |
| *C01B 3/24* | (2006.01) |
| *C01B 3/56* | (2006.01) |
| *C10G 1/00* | (2006.01) |
| *C10G 1/10* | (2006.01) |
| *C10G 47/00* | (2006.01) |
| *C10G 65/12* | (2006.01) |

(52) U.S. Cl.
CPC .............. *B01J 19/245* (2013.01); *C01B 3/24* (2013.01); *C01B 3/56* (2013.01); *C10G 1/002* (2013.01); *C10G 1/10* (2013.01); *C10G 47/00* (2013.01); *C10G 65/12* (2013.01); *B01D 2256/16* (2013.01); *B01J 2219/0004* (2013.01); *C01B 2203/0272* (2013.01); *C01B 2203/042* (2013.01); *C01B 2203/065* (2013.01); *C01B 2203/1241* (2013.01); *C10G 2300/1003* (2013.01); *C10G 2300/1007* (2013.01); *C10G 2300/1014* (2013.01); *C10G 2300/1018* (2013.01); *C10G 2300/4081* (2013.01); *C10G 2300/42* (2013.01)

(58) Field of Classification Search
CPC .... C10G 2300/1003; C10G 2300/1007; C10G 2300/1014; C10G 2300/1018; C10G 2300/4081; C10G 2300/42; B01D 3/143; B01D 53/047; B01D 2256/16; B01J 19/245; B01J 2219/0004; C01B 3/24; C01B 3/56; C01B 2203/0272; C01B 2203/042; C01B 2203/065; C01B 2203/1241

See application file for complete search history.

(56) References Cited

U.S. PATENT DOCUMENTS

| | | | |
|---|---|---|---|
| 8,329,968 | B2 | 12/2012 | Brandvold et al. |
| 9,061,951 | B2 | 6/2015 | Abhari et al. |
| 10,011,785 | B2 | 7/2018 | Eilos |
| 2009/0283442 | A1* | 11/2009 | McCall .................. C10G 45/02 208/15 |
| 2010/0038284 | A1 | 2/2010 | Vergel |
| 2012/0151828 | A1 | 6/2012 | Kalnes et al. |
| 2017/0137286 | A1* | 5/2017 | Lindell ..................... C01B 3/56 |

FOREIGN PATENT DOCUMENTS

| | | |
|---|---|---|
| WO | WO 2019/228797 A1 | 12/2019 |
| WO | WO 2021/180805 A1 | 9/2021 |
| WO | WO 2021/180808 A1 | 9/2021 |

OTHER PUBLICATIONS

Dybkjær (1995) "Tubular reforming and autothermal reforming of natural gas—an overview of available processes", *Fuel Processing Technology*, 42:85-107, DOI: 10.1016/0378-3820(94)00099-F.

Rostrup-Nielsen et al. (2002) "Large-scale hydrogen production", *CATTECH*, 6(4):150-159.

\* cited by examiner

PROCESS AND PLANT FOR PRODUCING HYDROCARBONS WITH REDUCED CO₂-FOOTPRINT AND IMPROVED HYDROGEN INTEGRATION

CROSS-REFERENCE TO RELATED APPLICATIONS

This application is a continuation application of International Application No. PCT/EP2021/056085 filed Mar. 10, 2021 (WO 2021/180805), which claims priority to and the benefit of European Patent Application Serial No. 20162995.3, filed Mar. 13, 2020, which are each hereby incorporated by reference in its entirety.

FIELD OF THE INVENTION

The present invention relates to a hydrotreatment process and plant for producing a hydrocarbon product boiling in transportation fuel range, in particular any of the diesel fuel boiling range, jet fuel boiling range and naphtha boiling range, by the hydroprocessing of a feedstock originating from renewable sources, and which is combined i.e. integrated with a hydrogen producing unit for generating at least part of the hydrogen required in said hydroprocessing, thereby drastically reducing hydrocarbon consumption, particularly natural gas used as feed and fuel in the hydrogen producing unit, whilst also minimizing carbon dioxide footprint and plant costs.

BACKGROUND OF THE INVENTION

There is a growing interest to produce diesel, jet fuel and naphtha from renewable feedstocks. Often this renewable feedstock contains high amount of oxygen compound and unsaturated hydrocarbon. During the hydrotreating of renewable feedstock, the oxygen is mainly removed as $H_2O$, which gives a paraffinic fuel consisting of paraffins with the same number for carbon atoms as in the backbone of the triglycerides. This is called the hydrodeoxygenation (HDO) pathway. Oxygen can also be removed by dicarboxylic pathway, which generates $CO_2$ instead of $H_2O$.

HDO pathway: $C_{17}H_{34}COOH + 3.5H_2 \leftrightarrow H\,C_{18}H_{38} + 2H_2O$ Decarboxylation pathway: $C_{17}H_{34}COOH + 0.5H_2H \leftrightarrow C_{17}H_{36} + CO_2$ Besides, there are some side reactions Gas-water shift reaction: $CO_2 + H_2 \leftrightarrow CO + H_2O$ Methanation: $CO + 3H_2H \leftrightarrow CH_4 + H_2O$ Some of the renewable feed also contain nitrogen. Removing nitrogen also requires hydrogen.

Overall, hydrotreating of renewable feedstock (feedstock rich in e.g. oxygenates including vegetable oils and others) requires high amount of hydrogen gas consumption. To produce this high amount of hydrogen, requirement of hydrocarbon feed e.g. natural gas as feed and fuel is very high. This will also increase the $CO_2$ footprint.

U.S. Pat. No. 7,626,063 describes a process for converting vegetable oils and fats into hydrocarbon compounds boiling in the diesel fuel boiling range, requiring a minimal amount of outside hydrogen. Propane formed during catalytic hydrotreatment of the vegetable oils and fats, is used to generate at least 50% of the hydrogen required in the catalytic treatment. The hydrogen generation step includes the use of steam methane reformer and optionally also water gas shift.

U.S. Pat. No. 10,011,785 describes an integrated process for producing hydrocarbons from a feed originating from renewable sources whereby the total consumption of hydrogen can be decreased, in which a light component stream (comprising C1-C5 hydrocarbons) formed during catalytic hydroprocessing of the feed, is passed through an amine absorber for removing $CO_2$ and $H_2S$, and the resulting stream is divided into a first and second recycle stream. The first recycle stream is led to the catalytic hydroprocessing unit and the second recycle stream is led to a hydrogen producing unit.

U.S. Pat. No. 8,324,438 discloses a process producing at least one blended fuel from a paraffin rich component and a cyclic rich component, where each of the components are generated from a renewable feedstock. The process includes steam reforming for hydrogen production using a separated overhead stream from a hot separator containing hydrogen and from which $CO_2$ and $H_2S$ have been removed in a scrubber. A portion of lighter materials from downstream fractionation is optionally conducted to the steam reforming.

Similarly, CA 2,718,509A1 discloses a process for producing aviation fuel from renewable feedstocks, in which a $CO_2$ and $H_2S$-depleted overhead stream from a hot separator is combined with a hydrogen stream from a reforming zone. A portion of lighter materials from downstream fractionation is optionally conducted to the steam reforming.

US 2012/151828 A1 discloses a process including the hydroprocessing of fats, oils, and waxes to produce low carbon footprint distillate fuels. An overhead stream from a separator is conducted to a product recovery section, whereby a $CO_2$-rich fraction is withdrawn. A portion of lighter materials (LPG analogue) from downstream fractionation is optionally conducted to a hydrogen generation unit, thereby producing hydrogen which is used in the process, optionally together with an external source of make-up hydrogen.

SUMMARY OF THE INVENTION

We have found that apart from the reduction of the total consumption of hydrogen, it is now also possible to integrate a renewable feed hydrotreatment unit with a hydrogen production unit and minimize the energy consumption for the overall process/plant, mainly by minimizing natural gas consumption for production of hydrogen required for hydroprocessing of the renewable feed, thereby drastically reducing the carbon dioxide footprint of the plant.

Accordingly, in a first aspect, the invention provides a process for producing a hydrocarbon product, said process comprising the steps of:

i) passing a feedstock originating from a renewable source through a hydroprocessing stage for producing a main hydrotrotreated stream;

ii) passing the main hydrotreated stream to a separation stage for producing:

an aqueous stream;

a hydrogen-rich stream as a first recycle gas stream;

an off-gas stream comprising hydrocarbons;

and said hydrocarbon product, boiling at above 50° C.;

iii) passing the first recycle gas stream to the hydroprocessing stage;

iv) passing the second recycle gas stream to a hydrogen producing unit for producing a hydrogen stream as a make-up hydrogen stream;

v) passing the make-up hydrogen stream to the hydroprocessing stage;

wherein prior to conducting step iv), said off-gas stream passes to a separation stage, the separation stage preferably being at least one of an amine absorption stage, a caustic scrubber, and a sulfur absorbent, for removing H$_2$S and thereby producing said second recycle gas stream.

It would be understood, that for the purposes of the present application, the hydrogen rich stream is also referred as first recycle gas stream. The off-gas stream comprising hydrocarbons, is also simply referred as off-gas stream.

The obtained second recycle gas stream entering the hydrogen producing unit contains therefore light hydrocarbons such as C1-C4 hydrocarbons, H$_2$, NH$_3$, CO and CO$_2$, yet no H$_2$S or only minor amounts of H$_2$S. The off-gas stream and second recycle stream derived thereof contains hydrogen not consumed from the hydrotreating unit(s) of the hydroprocessing stage as soluble hydrogen in hydrocarbon phase, and is suitably used as part of the feed in the hydrogen producing unit, which is described farther below.

Hence, a hydroprocessing and separation stage for producing renewable hydrocarbon products is integrated with a hydrogen producing unit in an overall process or plant by use of at least two recycle streams separately withdrawn from the separation stage, thereby drastically reducing energy consumption figures, in particular natural gas used as feed and fuel in the process, as it will become apparent from the description and examples farther below. For instance, by the invention a significant reduction in natural gas consumption in the range 40-90% or more is achieved in the hydrogen producing unit, whilst at the same time enabling a smaller size of the hydrogen production unit.

In an embodiment, the entire off-gas stream passes to the separation stage. Hence, there is full utilization within the process and plant of such off-gas stream and thereby integration.

In an embodiment, the entire second recycle gas stream passes to the hydrogen producing unit. Thereby there is less consumption of e.g. the natural gas used as feed and fuel in the hydrogen producing unit, compared to an instance where only a portion of the second recycle stream is passed to the hydrogen producing unit.

In an embodiment, said hydrogen-rich stream comprises 50% vol. H$_2$ or more, light hydrocarbons such as C1-C4 hydrocarbons, optionally also H$_2$S and NH$_3$, CO and CO$_2$.

By the invention, said hydrogen-rich stream, i.e. the first recycle gas stream, is not subjected to a separation stage for removing H$_2$S and/or CO$_2$, optionally also for removing NH$_3$ and/or CO, prior to being passed to the hydroprocessing stage, in particular prior to being passed to the first catalytic hydrotreating unit therein. The first catalytic hydrotreating unit is suitably for hydrodeoxygenation, as it will become apparent from the description farther below.

The first recycle gas stream is significantly larger i.e. significantly larger flow rate, than the off-gas stream, thus the provision of a separation stage such as an amine scrubber in the first recycle stream for removing H$_2$S and/or CO$_2$, often for removing H$_2$S and CO$_2$, is by the present invention obviated, without incurring any penalty in the process, for instance by using a nickel-molybdenum catalyst for hydrodeoxygenation as in applicant's co-pending patent application EP 20162755.1. Furthermore, renewable feeds such as vegetable oil, animal fat etc., often lack enough sulfur compared with conventional fossil feed. As a result, an external sulfur agent such as dimethyl disulfide (DMDS) or other sulfur agent has normally been introduced with conventional fossil feed to provide the minimum required H$_2$S amount in the hydrogen rich gas to hydrodeoxygenation to keep the hydrotreating e.g. hydrodeoxygenation catalyst therein in sulfided form. So, use of high pressure amine absorber will remove the H$_2$S from recycle gas prior to sending back to the hydroprocessing. This results in more addition of external sulfur agent and added cost.

By the invention, a separation stage such as an amine scrubber is provided in the much smaller off-gas stream and targeted for H$_2$S removal, thereby simplifying the process and reducing capital and operating expenses, as well as reducing energy consumption, by virtue of using a smaller separation stage in a smaller stream, i.e. the offgas stream. More specifically, there is less amine, e.g. lean amine, requirement thus resulting in a smaller amine regeneration unit and less amount of steam required to regenerate the amine. In addition, the amine scrubber in the off-gas stream is suitably a low pressure amine absorption system, which conveys much lower capital and operating expenses compared to high pressure amine absorption systems which are normally used when cleaning the first recycle gas prior to passing it to the hydrodeoxygenation.

Furthermore, while it is also possible to remove the CO$_2$ in the off-gas stream, suitably the CO$_2$ is not removed for avoiding the emission of CO$_2$ to the atmosphere, since the hydrogen producing unit, e.g. a pre-reforming unit therein, can operate with the second recycle also containing CO$_2$. A lower carbon footprint is thereby obtained. Where necessary, an amine which is more selective towards H$_2$S removal can be selected, with CO$_2$ removal being incidental. The removal of H$_2$S from the off-gas stream minimizes the need for sulfur adsorbent in the hydrogen producing unit, in particular a cleaning unit therein.

In an embodiment, said off-gas stream comprises light hydrocarbons in the form of C1-C4 hydrocarbons, H$_2$, CO, CO$_2$, and optionally also H$_2$S.

In an embodiment, said hydrocarbon product, boiling at above 50° C., is a hydrocarbon product boiling at least in one of: the diesel fuel boiling range, jet fuel boiling range, and naphtha boiling range.

In an embodiment, the process further comprises: vi) splitting said hydrogen-rich stream into said first recycle gas stream and a third recycle gas stream, and passing said third recycle gas stream to said hydrogen producing unit. Thereby, further integration is achieved. The third recycle gas stream is withdrawn as a purge stream which by passing it to the hydrogen producing unit enables increasing the purity of the hydrogen loop.

In an embodiment, in step i) the hydroprocessing stage comprises:

i-1) passing the feedstock through a first catalytic hydrotreating unit under the addition of hydrogen for producing a first hydrotreated stream, preferably comprising C1-C30 hydrocarbons, i-2) passing the first hydrotreated stream to a dewaxing section comprising a second catalytic hydrotreating unit under the addition of hydrogen for producing said main hydrotreated stream.

In an embodiment, said first hydrotreated stream comprises C1-C30 hydrocarbons.

Optionally, the process comprises using one or more additional catalytic hydrotreating units under the addition of hydrogen, such as third catalytic hydrotreating unit or a cracking section. For instance, it would be understood that when a hydrocarbon product boiling in the jet fuel range is desired, a hydrocracking unit is suitably used, for instance prior to passing the thus resulting first hydrotreated stream to the dewaxing section.

In a particular embodiment, between step i-1) and i-2) the process further comprises passing the first hydrotreated stream to a separator such as a high-pressure or low-pressure separator, for removing H$_2$S, NH$_3$, and H$_2$O, thereby producing said first hydrotreated stream, and optionally also producing a vapor stream, and a recycle oil stream.

The first hydrotreated stream from the first catalytic hydrotreating unit normally contains impurities, in particular $H_2S$, $NH_3$, CO and $CO_2$ which may be detrimental for the catalyst used in the subsequent dewaxing section. When the process is operated in so-called sour mode, the catalyst of the dewaxing section is a base-metal catalyst, which is resistant to impurities, thereby avoiding the need of using a separator. When operating in the so-called sweet mode, the catalyst of the dewaxing section is a noble-metal catalyst, which is sensitive to the impurities, thereby requiring the need of using the separator.

In an embodiment, in step ii) the separation stage comprises:

ii-1) passing the main hydrotreated stream to a separator, preferably a cold separator, for producing said aqueous stream, said hydrogen-rich stream, and a heavy hydrocarbon stream;

ii-2) passing the heavy hydrocarbon stream to a fractionation section, such as stripping section, for producing said off-gas stream, and said hydrocarbon product e.g. a hydrocarbon product boiling at least in one of: the diesel fuel boiling range, jet fuel boiling range, and naphtha boiling range.

In an embodiment, said heavy hydrocarbon stream comprises C5-C30 hydrocarbons, $H_2$, CO and $CO_2$.

In an embodiment, in step v) the make-up hydrogen stream passes to at least one of: said first catalytic hydrotreating unit;

said separator between step i-1) and i-2), such as a high pressure stripper; second catalytic hydrotreating unit;

and optionally also an additional catalytic hydrotreating unit such as a third catalytic hydrotreating unit.

In an embodiment, the first recycle stream is passed to the first catalytic hydrotreating unit.

It would be understood, that the addition of hydrogen of step i), in particular step i-1), i-2) and optionally also in the step in between, i.e. passing the first hydrotreated stream to a separator for removing $H_2S$ and $NH_3$, is mainly from said make-up hydrogen stream and said first recycle stream. The present invention provides a high level of integration, hence there is no need to resort to the use of external make-up hydrogen, i.e. make-up hydrogen supplied from outside the process and plant of the present invention.

In an embodiment, the hydrogen producing unit comprises feeding: said second recycle gas stream, and a hydrocarbon feedstock such as natural gas, optionally together with one or more of said hydrocarbon products, such as naphtha and other light products, i.e. "renewable naphtha" produced in the process. Natural gas and optionally said naphtha, and the second recycle stream are preferably fed separately to the hydrogen producing unit. It is also envisaged, that the thus recycled naphtha and other light products is used as the major portion of or even all of the hydrocarbon feedstock. By including a part of the hydrocarbon product, in particular the renewable naphtha as part of the hydrocarbon feed to the hydrogen producing unit, an even higher reduction in energy consumption is achieved.

The hydrocarbon feedstock for the hydrogen production unit may also include LPG, biogas, methane, or combinations thereof.

It would also be understood that said hydrocarbon products, i.e. products produced according to the process of the invention represent so-called green products or renewable products, thus the diesel product is a renewable diesel, the jet fuel is a renewable jet fuel and the naphtha is a renewable naphtha.

In an embodiment, the hydrogen producing unit comprises subjecting the hydrocarbon feedstock to: cleaning in a cleaning unit, said cleaning unit preferably being a sulfur-chlorine-metal absorption or catalytic unit; optionally pre-reforming in a pre-reforming unit; catalytic steam methane reforming in a steam reforming unit; water gas shift conversion in a water gas shift unit; optionally carbon dioxide removal in a $CO_2$-separator unit; and hydrogen purification in a hydrogen purification unit.

In a particular embodiment, said second recycle gas stream is fed to the cleaning unit. This is an efficient way of utilizing available hydrogen in the process, as the sulfur-chlorine-metal absorption or catalytic unit normally requires addition of hydrogen.

In an embodiment, the hydrogen-rich stream, or first recycle stream, or third recycle stream comprises hydrogen in a concentration of 50 vol % or higher, preferably 70% vol. hydrogen or higher, and any of said streams is passed through a hydrogen purification unit: prior to splitting said hydrogen-rich stream into a first recycle stream or a third recycle stream, or prior to passing the first recycle stream to the hydroprocessing stage, or prior to passing said third recycle stream to hydrogen producing unit. Preferably, only the third recycle stream passes to the hydrogen purification unit.

This enables that the steam reformer size be reduced, thereby minimizing the overall capital expenses of the hydrogen production unit.

The hydrogen purification unit may be a $H_2$-membrane unit, or a Pressure Swing Adsorption unit (PSA-unit).

While the above hydrogen purification unit may be a dedicated (separate) unit, in a particular embodiment the hydrogen purification unit is the hydrogen purification unit of the hydrogen producing unit, and said third recycle stream is passed through this hydrogen purification unit. This further facilitates integration and higher energy efficiency of the overall plant/process, i.e. section comprising hydroprocessing and separation stages, and the hydrogen producing unit. In addition, there is a more expedient use of the already available hydrogen purification unit of the hydrogen producing unit, since one normally would expect a requirement of this unit to provide a hydrogen stream with at least 99 vol. % $H_2$, whereas by the present invention there is a less strict requirement on hydrogen purity, as this hydrogen is used in the hydroprocessing stage, in particular the first, second catalytic hydrotreatment, as well as any additional catalytic hydrotreatment, such as a third catalytic hydrotreatment.

In another particular embodiment, the hydrogen purification unit is a Pressure Swing Adsorption unit (PSA unit), said PSA unit producing an off-gas stream, i.e. PSA off-gas, which is used as fuel in the steam reforming unit of the hydrogen producing unit, and/or in fired heaters in any of the catalytic hydrotreating units of the hydroprocessing stage, separation units of the separation stage, and/or for steam production. This enables further reduction of hydrocarbon consumption, thereby improving energy consumption figures, i.e. higher energy efficiency, as PSA off-gas which otherwise will need to be burned off (flared), is expediently used in the process.

In an embodiment, the steam reforming unit is: a convection reformer, preferably comprising one or more bayonet reforming tubes such as an HTCR reformer i.e. Topsøe bayonet reformer, where the heat for reforming is transferred by convection along with radiation; a tubular reformer i.e.

conventional steam methane reformer (SMR), where the heat for reforming is transferred chiefly by radiation in a radiant furnace; autothermal reformer (ATR), where partial oxidation of the hydrocarbon feed with oxygen and steam followed by catalytic reforming; electrically heated steam methane reformer (eSMR), where electrical resistance is used for generating the heat for catalytic reforming; or combinations thereof. In particular, when using e-SMR, electricity from green resources may be utilized, such as from electricity produced by wind power, hydropower, and solar sources, thereby further minimizing the carbon dioxide footprint.

For more information on these reformers, details are herein provided by direct reference to Applicant's patents and/or literature. For instance, for tubular and autothermal reforming an overview is presented in "Tubular reforming and autothermal reforming of natural gas—an overview of available processes", Ib Dybkjaer, Fuel Processing Technology 42 (1995) 85-107; and EP 0535505 for a description of HTCR. For a description of ATR and/or SMR for large scale hydrogen production, see e.g. the article "Largescale Hydrogen Production", Jens R. Rostrup-Nielsen and Thomas Rostrup-Nielsen": https://www.topsoe.com/sites/default/files/topsoe_large_scale_hydrogen_produc.pdf For a description of e-SMR which is a more recent technology, reference is given to in particular WO 2019/228797 A1.

In an embodiment, the catalyst in the steam reforming unit is a reforming catalyst, e.g. a nickel based catalyst. In an embodiment, the catalyst in the water gas shift reaction is any catalyst active for water gas shift reactions. The said two catalysts can be identical or different. Examples of reforming catalysts are $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, $Ni/ZrO_2$, $Ni/MgAl_2O_3$, $Ni/CaAl_2O_3$, $Ru/MgAl_2O_3$, or $Rh/MgAl_2O_3$, a noble metal on an $Al_2O_3$ carrier, but other catalysts suitable for reforming are also conceivable. The catalytically active material may be Ni, Ru, Rh, Ir, or a combination thereof, while the ceramic coating may be $Al_2O_3$, $ZrO_2$, $MgAl_2O_3$, $CaAl_2O_3$, or a combination therefore and potentially mixed with oxides of Y, Ti, La, or Ce. The maximum temperature of the reactor may be between 850-1300° C. The pressure of the feed gas may be 15-180 bar, preferably about 25 bar. Steam reforming catalyst is also denoted steam methane reforming catalyst or methane reforming catalyst.

In an embodiment, prior to passing the make-up hydrogen stream to the hydroprocessing stage, the makeup hydrogen stream passes through a compressor section comprising a make-up compressor optionally also a recycle compressor, the make-up compressor also producing a hydrogen recycle stream which is added to the hydrogen producing unit, preferably directly to the second recycle stream entering the hydrogen producing unit, and/or to the cleaning unit of the hydrogen producing unit. This enables even better integration, since there is no need for a separate or dedicated compressor for recycling hydrogen within the hydrogen producing unit for e.g. hydrogenation of sulfur in the cleaning unit.

In a particular embodiment, prior to passing the first recycle stream to the hydroprocessing stage, the first recycle stream passes through said recycle compressor, i.e. recycle compressor comprised in the compressor section.

In an embodiment, the feedstock is obtained from a raw material of renewable origin, such as originating from plants, algae, animals, fish, vegetable oil refining, domestic waste, waste rich in plastic, industrial organic waste like tall oil or black liquor, or a feedstock derived from one or more oxygenates taken from the group consisting of triglycerides, fatty acids, resin acids, ketones, aldehydes or alcohols where said oxygenates originate from one or more of a biological source, a gasification process, a pyrolysis process, Fischer-Tropsch synthesis, or methanol based synthesis. The oxygenates may also originate from a further synthesis process. Some of these feedstocks may contain aromatics; especially products from pyrolysis processes or waste products from e.g. frying oil. Any combinations of the above feedstocks are also envisaged.

In another embodiment, step i) may also comprise adding a feedstock originating from a fossil fuel source, such as diesel, kerosene, naphtha, and vacuum gas oil (VGO), or a recycled hydrocarbon product. This additional feedstock acts as a hydrocarbon diluent, thereby enabling the absorption of heat from the exothermal reactions in the catalytic hydrotreating unit(s) of the hydroprocessing stage.

In an embodiment, the first catalytic hydrotreating unit is hydrodeoxygenation (HDO) i.e. HDO is conducted in a HDO unit, the second catalytic hydrotreating is hydrodewaxing (HDW), and an additional catalytic hydrotreating such as a third catalytic hydrotreating is hydrocracking (HCR).

The material catalytically active in hydrotreating, typically comprises an active metal (sulfided base metals such as nickel, cobalt, tungsten and/or molybdenum, but possibly also either elemental noble metals such as platinum and/or palladium) and a refractory support (such as alumina, silica or titania, or combinations thereof).

Hydrotreating conditions involve a temperature in the interval 250-400° C., a pressure in the interval 30-150 bar, and a liquid hourly space velocity (LHSV) in the interval 0.1-2, optionally together with intermediate cooling by quenching with cold hydrogen, feed or product The material catalytically active in hydrodewaxing typically comprises an active metal (either elemental noble metals such as platinum and/or palladium or sulfided base metals such as nickel, cobalt, tungsten and/or molybdenum), an acidic support (typically a molecular sieve showing high shape selectivity, and having a topology such as MOR, FER, MRE, MWW, AEL, TON and MTT) and a refractory support (such as alumina, silica or titania, or combinations thereof).

Isomerization conditions involve a temperature in the interval 250-400° C., a pressure in the interval 20-100 bar, and a liquid hourly space velocity (LHSV) in the interval 0.5-8.

The material catalytically active in hydrocracking is of similar nature to the material catalytically active in isomerization, and it typically comprises an active metal (either elemental noble metals such as platinum and/or palladium or sulfided base metals such as nickel, cobalt, tungsten and/or molybdenum), an acidic support (typically a molecular sieve showing high cracking activity, and having a topology such as MFI, BEA and FAU) and a refractory support (such as alumina, silica or titania, or combinations thereof). The difference to material catalytically active isomerization is typically the nature of the acidic support, which may be of a different structure (even amorphous silica-alumina) or have a different acidity e.g. due to silica:alumina ratio.

Hydrocracking conditions involve a temperature in the interval 250-400° C., a pressure in the interval 30-150 bar, and a liquid hourly space velocity (LHSV) in the interval 0.5-8, optionally together with intermediate cooling by quenching with cold hydrogen, feed or product Other types of hydrotreating are also envisaged, for instance hydrodearomatization (HDA). The material catalytically active in hydrodearomatization typically comprises an active metal (typically elemental noble metals such as platinum and/or palladium but possibly also sulfided base metals such as nickel, cobalt, tungsten and/or molybdenum) and a refractory support (such as amorphous silica-alumina, alumina, silica or titania, or combinations thereof).

Hydrodearomatization conditions involve a temperature in the interval 200-350° C., a pressure in the interval 20-100 bar, and a liquid hourly space velocity (LHSV) in the interval 0.5-8.

In second aspect, the invention encompasses also the treatment of a feedstock originating from a fossil fuel source.

Accordingly, there is also provided a process for producing a hydrocarbon product, said process comprising the steps of:

i) passing a feedstock originating from a fossil fuel source through a hydroprocessing stage for producing a main hydrotrotreated stream;

ii) passing the main hydrotreated stream to a separation stage for producing:
optionally an aqueous stream,
a hydrogen-rich stream as a first recycle gas stream,
an off-gas stream comprising hydrocarbons,
and said hydrocarbon product, boiling at above 50° C.;

iii) passing the first recycle gas stream to the hydroprocessing stage;

iv) passing the off-gas stream as a second recycle gas stream to a hydrogen producing unit for producing a hydrogen stream as a make-up hydrogen stream;

v) passing the make-up hydrogen stream to the hydroprocessing stage;

wherein prior to conducting step iv), said off-gas stream passes to a separation stage, the separation stage preferably being at least one of an amine absorption stage, a caustic scrubber, and a sulfur absorbent, for removing $H_2S$ and thereby producing said second recycle gas stream.

In an embodiment of the second aspect of the invention, the feedstock originating from a fossil fuel is diesel, kerosene, naphtha, and vacuum gas oil (VGO).

In another embodiment of the second aspect of the invention, step i) may also comprise adding a feedstock originating from a renewable source, as recited in connection with the first aspect of the invention.

In a third aspect, the invention is a plant, i.e. process plant, for producing a hydrocarbon product, comprising:

a hydroprocessing section arranged to receive a feedstock originating from a renewable source and a compressed hydrogen-rich feed stream for producing a main hydrotreated stream;

a separation section arranged to receive said main hydrotreated stream for producing an aqueous stream, a hydrogen-rich stream as a first recycle gas stream, an off-gas stream comprising hydrocarbons as a second recycle stream, and said hydrocarbon product, boiling at above 50° C.;

a separation section, which is preferably at least one of an amine absorption stage, a caustic scrubber, and a sulfur absorbent, arranged to receive said off-gas stream, for removing $H_2S$ and thereby producing said second recycle gas stream;

a hydrogen producing unit (HPU) arranged to receive said second recycle gas stream and a hydrocarbon feedstock for producing a make-up hydrogen stream;

a compressor section arranged to receive said first recycle gas stream and at least a portion of the make-up hydrogen stream produced in said HPU, for generating said compressed hydrogen-rich feed stream and a make-up hydrogen recycle stream;

a conduit for passing said first recycle gas stream to said compressor section;

a conduit for passing said make-up hydrogen stream from the HPU to said compressor section;

optionally a conduit for recycling said make-up hydrogen recycle stream to the HPU.

optionally means for splitting said hydrogen-rich stream into said first recycle gas stream and a third recycle gas stream, and a conduit for passing said third recycle gas stream to said HPU.

Any of the above embodiments of the first aspect of the invention may be used together with the second aspect and third aspect of the invention. It would be understood, that any of the associated benefits of the above embodiments of the first aspect of the invention may also be used together with the second aspect and third aspect of the invention

DETAILED DESCRIPTION

Figure 1:
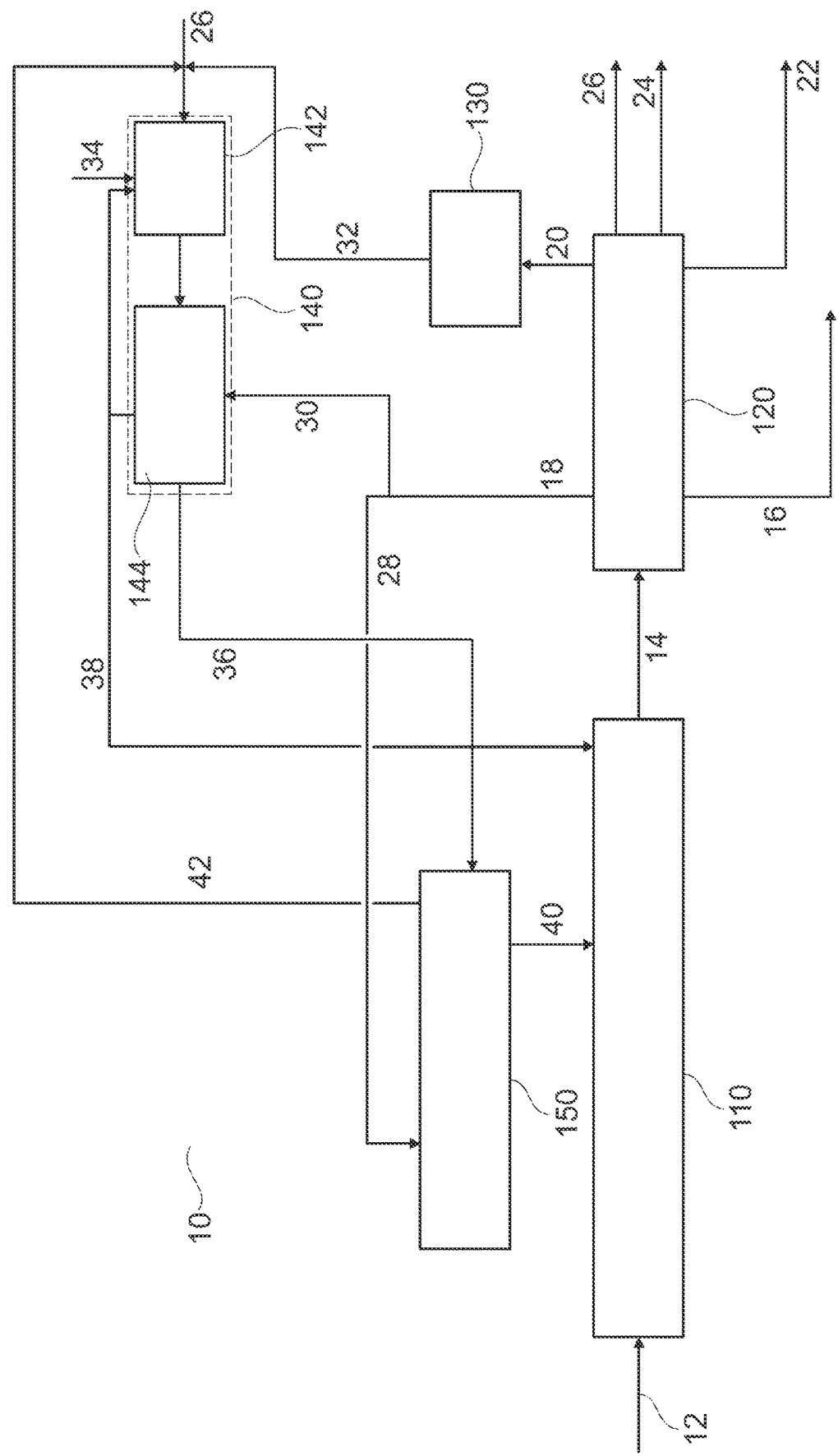
FIG. 1 shows a schematic flow diagram of the overall process/plant, i.e. integrated process/plant, according to a specific embodiment of the invention.

With reference to FIG. 1, a block flow diagram of the overall process/plant 10 is shown, where renewable feed 12 such as soy oil, rapeseed oil, or used cooked oil is fed to the hydroprocessing stage 110. This stage or section comprises a feed section and reactor section including HDO, HDW and optionally also HCR (hydrocracking) units, for producing a main hydrotreated stream 14, which is then passed to separation stage 120 which produces: aqueous (water) stream 16; hydrogen-rich stream 18 preferably having 50% vol. $H_2$ or more, light hydrocarbons, $H_2S$, CO and $CO_2$; off-gas stream 20 comprising hydrocarbons such as light hydrocarbon stream, also comprising $NH_3$, CO, $CO_2$ and $H_2S$ and optionally also hydrogen not consumed in the hydrotreating unit(s) as soluble hydrogen in hydrocarbon phase; and hydrocarbon products in the form of renewable diesel 22, renewable jet fuel 24 and renewable naphtha 26. The hydrogen-rich stream 18 is split to form a first recycle stream 28, while the off-gas stream 20 passes to a $H_2S$ removal stage 130 to form a treated off-gas stream in the form of second recycle stream 32, which is then used as feed for the hydrogen producing unit 140, together with the produced renewable product, e.g. renewable naphtha 26. A third recycle gas stream 30 is formed by splitting the hydrogen-rich stream 18. The first recycle stream 28 being sent to hydroprocessing stage 110 does not include the use of a separation section for removing $H_2S$ and/or carbon oxides (CO, $CO_2$).

The hydrogen producing unit 140 comprises a first section 142 which includes a cleaning unit such as sulfur-chlorine-metal absorption or catalytic unit, one or more pre-reformer units, steam reformer preferably a convection reformer (HTCR), and water gas shifting unit(s), as it is well known in the art of hydrogen production; none of these units are shown here. A hydrogen purification unit, such as PSA unit 144, is provided to further enrich the gas and produce a make-up hydrogen stream 36. This PSA-unit is also used to purify the third recycle gas stream 30. Off-gas 38 from the PSA unit (PSA offgas) is used as fuel in the hydrogen producing unit, and in particular as fuel for a HTCR unit, more particularly the burner of the HTCR unit, as well as in the hydroprocessing stage 110. A hydrocarbon feedstock in the form of natural gas stream 34 is used as make-up gas for the steam reforming in the hydrogen producing unit 140, 142.

The first recycle gas stream 28 passes to a compressor section 150 which includes a recycle compressor and make-up gas compressor, not shown. The first recycle gas stream 28 and make-up hydrogen stream 36 are then compressed by respectively the recycle compressor and the make-up compressor and used for adding hydrogen as stream 40 into the hydroprocessing stage 110. From the make-up compressor, a hydrogen stream 42 is recycled to hydrogen production unit 140, 142.

Figure 2:
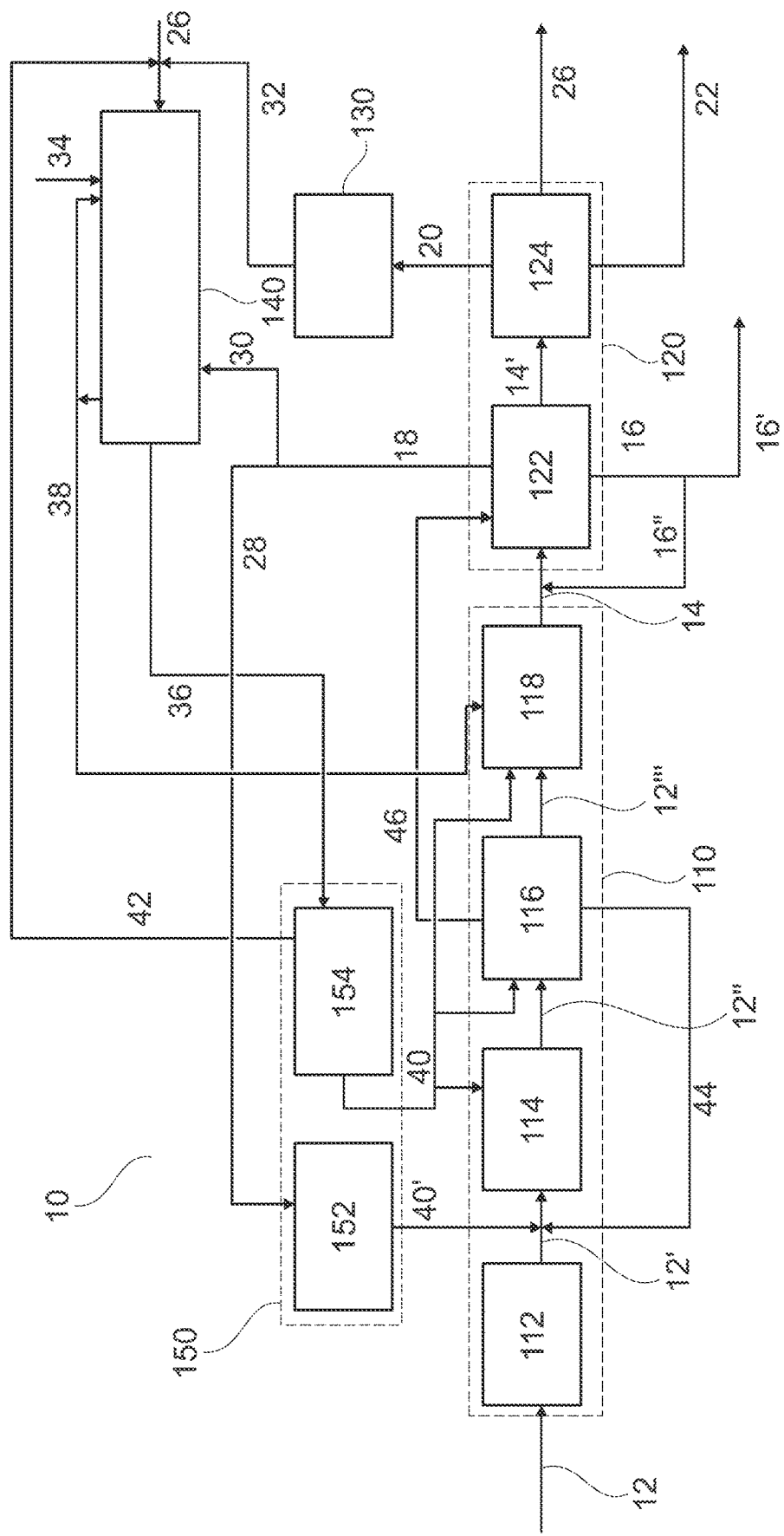
FIG. 2 shows a schematic flow diagram of the overall process/plant according to another specific embodiment of the invention.

With reference to FIG. 2, another specific embodiment of the invention is presented, showing particular details of the different sections of in particular the hydroprocessing stage 110 and separation stage 120 of FIG. 1. Renewable feed 12 enters the feed section 112 of the hydroprocessing stage 110, where it is mixed with hydrogen stream 40' from recycle compressor 152 as well as recycle oil 44 from a high pressure separator 116, such as a high pressure (HP) stripper, located downstream. The resulting renewable feed 12' is fed to a first catalytic hydrotreating unit, here a HDO unit 114, wherefrom a first hydrotreated stream 12" is withdrawn. This stream is then passed to the above high pressure separator 116 under the production of a vapor stream 46, recycle oil stream 44 and a liquid stream 12'''. The latter enters a dewaxing stage 118 comprising a second catalytic hydrotreating unit, here a HDW unit 118, for producing the main hydrotreated stream 14. A third catalytic hydrotreating unit in the form of a hydrocracking unit (HCR unit) may also be provided for instance downstream the HDO or HDW unit for producing the main hydrotreated stream 14. Such a hydrocracking unit may also be provided upstream the HDO unit, treating a recycle stream of heavy product in a so-called reverse staging layout. PSA off-gas stream 38 from the hydrogen producing unit 140 is suitably used as fuel in the dewaxing stage 118.

The main hydrotreated stream 14 may then be mixed with a wash-water stream 16", which is separated from water stream 16 produced in the downstream separation stage 120. The separation stage 120 includes the use of a separator 122, preferably a cold separator, and a subsequent stripping section 124. Vapor 46 generated in the previous high-pressure separator 116 is used for the operation of separator 122. From the separator 122, hydrogen-rich stream 18 is withdrawn in the form of a first recycle gas stream rich in hydrogen, as well as the above-mentioned water stream 16, which is then divided in sour water stream 16' and the wash-water stream 16". From the separator 122 a heavy hydrocarbon stream 14' preferably comprising C5-C30 hydrocarbons, $H_2$, $H_2S$, CO and $CO_2$, is produced which is then fed to the stripping section 124 under the production of the off-gas stream 20 comprising hydrocarbons, as well as the renewable diesel 22 and renewable naphtha 26 as the hydrocarbon products.

The hydrogen production unit 140 includes, as in FIG. 1 a hydrogen purification unit, preferably a PSA-unit (not shown) from which an off-gas stream 38 containing $CH_4$, $H_2$, CO and $CO_2$, is generated, and which is used as fuel in the process, not only in the hydrogen production plant itself, e.g. for the steam reforming unit, particularly a HTCR unit, but also in the hydroprocessing stage, in particular as shown here in the dewaxing section 118 therein. Accordingly, excess off-gas from the PSA not used in the hydrogen producing unit needs not to be burned off or flared.

The make-up hydrogen stream 36 is passed to the make-up compressor 154 of the compressor section 150. Compressed hydrogen stream 42 is recirculated to the hydrogen production unit 140, as well as to the hydroprocessing stage, particularly for the operation of the high pressure separator 116, HDW unit of dewaxing section 118 and optionally also the HDO unit 114, as compressed hydrogen stream 40. The first recycle gas stream 28 preferably comprising 50 wt % or more hydrogen is passed to a recycle compressor 152 of the compressor section 150, thereby producing another compressed hydrogen stream 40' which is used in the hydroprocessing stage, particularly for the operation of the HDO unit 114.

The third recycle gas stream 30 also preferably comprising 50 wt % or more hydrogen and also hydrocarbons, is purified in a hydrogen purification unit, which can be arranged separately from the hydrogen producing unit. FIGS. 1 and 2 envisage, however, the preferred option where the hydrogen purification unit, preferably a PSA-unit, already being part of the hydrogen producing unit, is also used to enrich the third recycle gas stream 30 in hydrogen, thereby further improving the integration of the overall process/plant.

Off-gas stream 20 is treated in $H_2S$ removal unit 130, preferably in a low pressure amine absorber, in order to form a treated off-gas stream as second recycle gas stream 32 which is used as e.g. feed together with renewable naphtha 26 and hydrogen recycle 42 in the hydrogen producing unit 140.

EXAMPLES

Example 1

A process layout according to FIG. 2, yet without the use of a separator 116, i.e. so-called HydroFlex™ sour mode, was used for renewable diesel production. For hydrogen production a HTCR-unit together with a PSA-unit for hydrogen purification was used, as well as prereforming and water gas shift. A basis of 100 kg/hr renewable feedstock is applied.

In the HydroFlex™ sour mode, sour gases ($H_2S$, and also $NH_3$) are not removed in the hydroprocessing stage of the process. Renewable feedstock together with hydrogen is processed in a HDO unit followed by a dewaxing unit (DW unit) for producing e.g. renewable diesel and renewable jet fuel. In the following performance is presented start of run with a fresh catalyst, and end of run with a catalyst having been in operation close to its commercial lifetime.

Soy oil is used as renewable feedstock. The feed rate to the hydroprocessing reactor (HDO as hydrotreating unit) is thus 100 kg/hr. Make-up hydrogen gas rate from hydrogen production unit 3.1 kg/hr (SOR, start of run) and 3.8 kg/hr (EOR, end of run). Exit gas rate (purge gas rate from the separation stage), i.e. first light hydrocarbon stream (first recycle gas stream 18 in the figure), is 0.0 kg/hr (SOR), 1.4 kg/hr (EOR), and offgas rate, i.e. second light hydrocarbon stream (stream 20), is 7.2 kg/hr (SOR), 8.0 kg/hr (EOR). Natural gas (NG) (stream 34) requirement for the hydrogen producing unit is 3.87 kg/hr (SOR), 3.38 kg/hr (EOR).

The percentage reduction in NG-consumption compared with non-integrated unit, providing same hydrogen requirement for hydrotreater is 63% (SOR), 73% (EOR). This represents about 6-7% savings in the steam reformer (HTCR) compared to 100% natural gas case, i.e. using the non-integrated hydrogen producing unit based on 100% natural gas.

Example 2

A process layout according to FIG. 2, but with removal of sour gases in the hydroprocessing stage, so-called HydroFlex™ sweet mode unit, was used for renewable diesel production. For hydrogen production a HTCR-unit together with a PSA-unit for hydrogen purification was used, as well as prereforming and water gas shift. A basis of 100 kg/hr renewable feedstock is applied.

In the HydroFlex™ sweet mode, sour gases ($H_2S$, and also $NH_3$) are removed in the hydroprocessing stage 110 of the process, e.g. in a separator 116 therein. Renewable feedstock together with hydrogen is processed in a HDO unit followed by removal of $H_2S$, $NH_3$ and then processed in dewaxing unit (HDW unit) for subsequent production of e.g. renewable diesel.

Rapeseed oil is used as renewable feedstock. The feed rate to the hydroprocessing reactor is 100 kg/hr. Make-up hydrogen gas rate from hydrogen producing unit is 4.79 kg/hr (SOR), 4.84 kg/hr (EOR). Exit gas (purge gas) rate from the separation stage, i.e. first light hydrocarbon stream, is 2.5 kg/hr (SOR), 2.9 kg/hr (EOR), and off gas rate, i.e. second light hydrocarbon stream, is 5.0 kg/hr (SOR), 5.8 kg/hr (EOR). NG requirement is then 8.37 kg/hr (SOR), 7.34 kg/hr (EOR).

The percentage reduction in NG-consumption compared with non-integrated unit, providing same hydrogen requirement for hydrotreater is 45% (SOR), 52% (EOR). This represents also a reduction of steam reformer (HTCR) size by about 11% compared to case with 100% NG.

Example 3

As in Example 2, HydroFlex™ sweet mode unit was used, yet now for renewable jet fuel production. A HTCR unit for hydrogen production together with a PSA-unit for hydrogen purification was used, as well as prereforming and water gas shift.

Used cooking oil is used as renewable feedstock. The feed rate to the hydroprocessing reactor is 100 kg/hr. Make-up hydrogen gas rate from hydrogen producing unit 4.79 kg/hr (SOR) and 4.84 kg/hr (EOR). Exit gas (purge gas) rate is 0.0 kg/hr (SOR), 1.37 kg/hr (EOR) and off-gas rate is 11.58 kg/hr (SOR), 12.72 kg/hr (EOR). NG requirement is then 2.6 kg/hr (SOR), 0.20 kg/hr (EOR).

The percentage reduction in NG-consumption compared with non-integrated unit, providing same hydrogen requirement for hydrotreater is 84% (SOR), 98% (EOR), with about 10% saving in HTCR size compared to case with 100% NG.

These examples thus show a significant reduction in NG consumption in the range 40-90% or more, whilst at the same time enabling a smaller size of the hydrogen production unit.

Thereby also, $CO_2$ emissions are drastically reduced. For instance, when having a NG consumption savings of about 70%, the $CO_2$ emission ($Nm^3/1000\ Nm^3\ H_2$) is also reduced by about 70%, as so are the operating expenses (about 70% cost reduction). Furthermore, there is a reduction in capital expenses of about 10%.

Example 4

This example shows some of the advantages of having the removal of $H_2S$ by amine scrubbing in the off-gas stream only. The basis for calculation is 100 kg/hr feed rate, as in previous examples. The percentage saving in steam is the same as the percentage saving in lean amine rates as these are proportional. The below table shows the results.

| | Amine consumption, kg/hr | | Steam savings in | |
| --- | --- | --- | --- | --- |
| Example | High Pressure absorber for total recycle gas to hydroprocessing (as used in prior art) | Off gas cleaning used HydroFlex ™ (invention) | amine regeneration by using amine for off gas cleaning only | Savings of lean amine |
| HydroFlex ™ sour mode unit | 92.4 | 26.9 | 71% | 71% |
| HydroFlex ™ sweet mode unit | 86.5 | 27.7 | 68% | 68% |
| HydroFlex ™ sweet mode jet production unit | 209.9 | 31.5 | 85% | 85% |

The invention is further described by the following points (embodiments):

1. A process for producing a hydrocarbon product, said process comprising the steps of:
   i) passing a feedstock originating from a renewable source through a hydroprocessing stage for producing a main hydrotrotreated stream;
   ii) passing the main hydrotreated stream to a separation stage for producing:
   an aqueous stream,
   a hydrogen-rich stream as a first recycle gas stream,
   an off-gas stream comprising hydrocarbons,
   and said hydrocarbon product, boiling at above 50° C.;
   iii) passing the first recycle gas stream to the hydroprocessing stage;
   iv) passing the off-gas stream as a second recycle gas stream to a hydrogen producing unit for producing a hydrogen stream as a make-up hydrogen stream;
   v) passing the make-up hydrogen stream to the hydroprocessing stage;
   wherein prior to conducting step iv), said off-gas stream passes to a separation stage, the separation stage preferably being at least one of an amine absorption stage, a caustic scrubber, and a sulfur absorbent, for removing $H_2S$ and thereby producing said second recycle gas stream.

2. Process according to point 1, wherein the entire off-gas stream passes to the separation stage.

3. Process according to any of points 1-2, wherein the entire second recycle gas stream passes to the hydrogen producing unit.

4. Process according to any of points 1-3, wherein the process further comprises: vi) splitting said hydrogen-rich stream into said first recycle gas stream and a third recycle gas stream, and passing said third recycle gas stream to said hydrogen producing unit.

5. Process according to any of points 1-4, wherein in step i) the hydroprocessing stage comprises:
   i-1) passing the feedstock through a first catalytic hydrotreating unit under the addition of hydrogen for producing a first hydrotreated stream;
   i-2) passing the first hydrotreated stream to a dewaxing section comprising a second catalytic hydrotreating unit under the addition of hydrogen for producing said main hydrotreated stream.

6. Process according to point 5, wherein between step i-1) and i-2) the process further comprises passing the first hydrotreated stream to a separator, such as a high-pressure or low-pressure separator, for removing $H_2S$, $NH_3$, and $H_2O$, thereby producing said first hydrotreated stream, and optionally also producing a vapor stream, and a recycle oil stream.

7. Process according to any of points 1-6, wherein in step ii) the separation stage comprises:
   ii-1) passing the main hydrotreated stream to a separator, preferably a cold separator, for producing said aqueous stream, said hydrogen-rich stream, and a heavy hydrocarbon stream;
   ii-2) passing the heavy hydrocarbon stream to a fractionation section for producing said off-gas stream, and said hydrocarbon product.

8. Process according to any of points 1-7, wherein in step v) the make-up hydrogen stream passes to at least one of:
   said first catalytic hydrotreating unit;
   said separator between step i-1) and i-2), such as a high pressure stripper; second catalytic hydrotreating unit;
   and optionally also an additional catalytic hydrotreating unit such as a third catalytic hydrotreating unit.

9. Process according to any of points 1-8, wherein the first recycle gas stream is passed to the first catalytic hydrotreating unit 10. Process according to point 8, wherein the first recycle gas stream is not subjected to a separation stage for removing $H_2S$ and/or $CO_2$, optionally also for removing $NH_3$ and/or CO, prior to being passed to the first catalytic hydrotreating unit.

11. Process according to any of points 1-10, wherein the hydrogen producing unit comprises feeding: said second recycle gas stream, and a hydrocarbon feedstock such as natural gas, optionally together with one or more of said hydrocarbon products, preferably naphtha.

12. Process according to any of points 1-11, wherein the hydrogen producing unit comprises subjecting the hydrocarbon feedstock to: cleaning in a cleaning unit, said cleaning unit preferably being a sulfur-chlorine-metal absorption or catalytic unit; optionally pre-reforming in a pre-reforming unit; catalytic steam methane reforming in a steam reforming unit; water gas shift conversion in a water gas shift unit; optionally carbon dioxide removal in a $CO_2$-separator unit; and hydrogen purification in a hydrogen purification unit.

13. Process according to point 12, wherein said second recycle gas stream is fed to the cleaning unit.

14. Process according to any of points 1-13, wherein the hydrogen-rich stream, or first recycle stream, or third recycle stream comprises hydrogen in a concentration of 50 vol % or higher, and wherein any of said streams is passed through a hydrogen purification unit: prior to splitting said hydrogen-rich stream into a first recycle stream or a third recycle stream, or prior to passing the first recycle stream to the hydroprocessing stage, or prior to passing said third recycle stream to hydrogen producing unit.

15. Process according to point 13, wherein the hydrogen purification unit is the hydrogen purification unit of the hydrogen producing unit, and said third recycle stream is passed through this hydrogen purification unit.

16. Process according to point 15, wherein the hydrogen purification unit is a Pressure Swing Adsorption unit (PSA unit), said PSA unit producing an off-gas stream which is used as fuel in the steam reforming unit of the hydrogen producing unit, and/or in fired heaters in any of the catalytic hydrotreating units of the hydroprocessing stage, separation units of the separation stage, and/or for steam production.

17. Process according to any of points 12-16, wherein the steam reforming unit is: a convection reformer, a tubular reformer, autothermal reformer (ATR), electrically heated steam methane reformer (e-SMR), or combinations thereof.

18. Process according to any of points 1-17, wherein prior to passing the make-up hydrogen stream to the hydroprocessing stage, the make-up hydrogen stream passes through a compressor section comprising a make-up compressor optionally also a recycle compressor, the make-up compressor also producing a hydrogen recycle stream which is added to the hydrogen producing unit, preferably directly to the second recycle stream entering the hydrogen producing unit, and/or to the cleaning unit of the hydrogen producing unit.

19. Process according to point 18, wherein prior to passing the first recycle stream to the hydroprocessing stage, the first recycle stream passes through said recycle compressor.

20. Process according to any of points 1-19, wherein the feedstock is obtained from a raw material of renewable origin, such as originating from plants, algae, animals, fish, vegetable oil refining, domestic waste, waste rich in plastic, industrial organic waste like tall oil or black liquor, or a feedstock derived from one or more oxygenates taken from the group consisting of triglycerides, fatty acids, resin acids, ketones, aldehydes or alcohols where said oxygenates originate from one or more of a biological source, a gasification process, a pyrolysis process, Fischer-Tropsch synthesis, or methanol based synthesis.

21. Process according to any of points 1-20, wherein step i) also comprises adding a feedstock originating from a fossil fuel source, such as diesel, kerosene, naphtha, and vacuum gas oil (VGO), and/or recycling a hydrocarbon product.

22. Process according to any of points 1-21, wherein the first catalytic hydrotreating is hydrodeoxygenation (HDO), the second catalytic hydrotreating is hydrodewaxing (HDW), and an additional catalytic hydrotreating such as a third catalytic hydrotreating is hydrocracking (HCR).

23. Process for producing a hydrocarbon product, said process comprising the steps of:
   i) passing a feedstock originating from a fossil fuel source through a hydroprocessing stage for producing a main hydrotrotreated stream;
   ii) passing the main hydrotreated stream to a separation stage for producing:
      optionally an aqueous stream,
      a hydrogen-rich stream as a first recycle gas stream,
      an off-gas stream comprising hydrocarbons,
      and said hydrocarbon product, boiling at above 50° C.;
   iii) passing the first recycle gas stream to the hydroprocessing stage;
   iv) passing the off-gas stream as a second recycle gas stream to a hydrogen producing unit for producing a hydrogen stream as a make-up hydrogen stream;
   v) passing the make-up hydrogen stream to the hydroprocessing stage;

wherein prior to conducting step iv), said off-gas stream passes to a separation stage, the separation stage preferably being at least one of an amine absorption stage, a caustic scrubber, and a sulfur absorbent, for removing $H_2S$ and thereby producing said second recycle gas stream.

24. Plant for producing a hydrocarbon product, comprising:
   a hydroprocessing section arranged to receive a feedstock originating from a renewable source and a compressed hydrogen-rich feed stream for producing a main hydrotreated stream;
   a separation section arranged to receive said main hydrotreated stream for producing an aqueous stream, a hydrogen-rich stream as a first recycle gas stream, an off-gas stream comprising hydrocarbons as a second recycle stream, and said hydrocarbon product, boiling at above 50° C.;
   a separation section, which is preferably at least one of an amine absorption stage, a caustic scrubber, and a sulfur absorbent, arranged to receive said off-gas stream, for removing $H_2S$ and thereby producing said second recycle gas stream;
   a hydrogen producing unit (HPU) arranged to receive said second recycle gas stream and a hydrocarbon feedstock for producing a make-up hydrogen stream;
   a compressor section arranged to receive said first recycle gas stream and at least a portion of the make-up hydrogen stream produced in said HPU, for generating said compressed hydrogen-rich feed stream and a make-up hydrogen recycle stream;
   a conduit for passing said first recycle gas stream to said compressor section;
   a conduit for passing said make-up hydrogen stream from the HPU to said compressor section;
   optionally a conduit for recycling said make-up hydrogen recycle stream to the HPU.
   optionally means for splitting said hydrogen-rich stream into said first recycle gas stream and a third recycle gas stream, and a conduit for passing said third recycle gas stream to said HPU.

The invention claimed is:
1. A process for producing a hydrocarbon product, said process comprising the steps of:
   i) passing a feedstock originating from a renewable source through a hydroprocessing stage for producing a main hydrotroteated stream;
   ii) passing the main hydrotreated stream to a separation stage for producing:
      an aqueous stream,
      a hydrogen-rich stream as a first recycle gas stream,
      an off-gas stream comprising hydrocarbons,
      and said hydrocarbon product, boiling at above 50° C.;
   iii) passing the first recycle gas stream to the hydroprocessing stage;
   iv) passing the off-gas stream as a second recycle gas stream to a hydrogen producing unit for producing a hydrogen stream as a make-up hydrogen stream;
   v) passing the make-up hydrogen stream to the hydroprocessing stage;
   wherein prior to conducting step iv), said off-gas stream passes to a separation stage for removing $H_2S$ and thereby producing said second recycle gas stream; and
   vi) splitting said hydrogen-rich stream into said first recycle gas stream and a third recycle gas stream, and passing said third recycle gas stream to said hydrogen producing unit.

2. The process according to claim 1, wherein in step i) the hydroprocessing stage comprises:
   i-1) passing the feedstock through a first catalytic hydrotreating unit under the addition of hydrogen for producing a first hydrotreated stream; and
   i-2) passing the first hydrotreated stream to a dewaxing section comprising a second catalytic hydrotreating unit under the addition of hydrogen for producing said main hydrotreated stream.

3. The process according to claim 2, wherein between step i-1) and i-2) the process further comprises passing the first hydrotreated stream to a separator for removing $H_2S$, $NH_3$, and $H_2O$, thereby producing said first hydrotreated stream.

4. The process according to claim 3, wherein said separator is a high-pressure separator or a low-pressure separator; and wherein the step of passing the first hydrotreated stream to said separator further produces a vapor stream, and a recycle oil stream.

5. The process according to claim 2, wherein in step v) the make-up hydrogen stream passes to at least one of:
   said first catalytic hydrotreating unit;
   a separator between step i-1) and i-2);
   second catalytic hydrotreating unit;
   and an additional catalytic hydrotreating unit.

6. The process according to claim 1, wherein in step ii) the separation stage comprises:
   ii-1) passing the main hydrotreated stream to a separator for producing said aqueous stream, said hydrogen-rich stream, and a heavy hydrocarbon stream; and
   ii-2) passing the heavy hydrocarbon stream to a fractionation section for producing said off-gas stream, and said hydrocarbon product.

7. The process of claim 6, wherein said separator is a cold separator.

8. The process according to claim 1, wherein the hydrogen producing unit comprises feeding: said second recycle gas stream, and a hydrocarbon feedstock with at least a part of said hydrocarbon product.

9. The process of claim 8, wherein the hydrocarbon feedstock comprises natural gas, and wherein said at least a part of said hydrocarbon product comprises naphtha.

10. The process according to claim 1, wherein the hydrogen producing unit comprises subjecting the hydrocarbon feedstock to: cleaning in a cleaning unit; catalytic steam methane reforming in a steam reforming unit; water gas shift conversion in a water gas shift unit and hydrogen purification in a hydrogen purification unit.

11. The process according to claim 10, wherein said second recycle gas stream is fed to the cleaning unit.

12. The process according to claim 11, wherein the hydrogen purification unit is the hydrogen purification unit of the hydrogen producing unit, and said third recycle gas stream is passed through this hydrogen purification unit.

13. The process according to claim 12, wherein the hydrogen purification unit is a Pressure Swing Adsorption unit (PSA unit), said PSA unit producing an off-gas stream which is used as fuel in the steam reforming unit of the hydrogen producing unit, and/or in fired heaters in any of the catalytic hydrotreating units of the hydroprocessing stage, separation units of the separation stage, and/or for steam production.

14. The process according to claim 11, wherein the steam reforming unit is: a convection reformer, a tubular reformer, autothermal reformer (ATR), electrically heated steam methane reformer (e-SMR), or any combinations thereof.

15. The process of claim 10, wherein said cleaning unit is a sulfur-chlorine-metal absorption or catalytic unit.

16. The process of claim 10, further comprising at least one of the steps of: pre-reforming in a pre-reforming unit; and carbon dioxide removal in a $CO_2$-separator unit.

17. The process according to claim 1, wherein the hydrogen-rich stream, or first recycle stream, or third recycle stream comprises hydrogen in a concentration of 50 vol % or higher, and wherein any of said streams is passed through a hydrogen purification unit: prior to splitting said hydrogen-rich stream into the first recycle stream or the third recycle stream, or prior to passing the first recycle stream to the hydroprocessing stage, or prior to passing said third recycle stream to the hydrogen producing unit.

18. The process according to claim 1, wherein prior to passing the make-up hydrogen stream to the hydroprocessing stage, the make-up hydrogen stream passes through a compressor section comprising a make-up compressor, the make-up compressor also producing a hydrogen recycle stream which is added to the hydrogen producing unit.

19. The process of claim 18, wherein the hydrogen recycle stream from the make-up compressor is added directly to the second recycle stream entering the hydrogen producing unit, and/or to the cleaning unit of the hydrogen producing unit.

20. The process according to claim 1, wherein the feedstock is obtained from a raw material of renewable origin originating from plants, algae, animals, fish, vegetable oil refining, domestic waste, waste rich in plastic, industrial organic waste, or a feedstock derived from one or more oxygenates taken from the group consisting of triglycerides, fatty acids, resin acids, ketones, aldehydes or alcohols where said oxygenates originate from one or more of a biological source, a gasification process, a pyrolysis process, Fischer-Tropsch synthesis, or methanol based synthesis.

21. The process according to claim 1, wherein step i) also comprises adding a feedstock originating from a fossil fuel source and/or recycling a hydrocarbon product.

22. The process according to claim 1, wherein the separation stage is at least one of an amine absorption stage, a caustic scrubber, and a sulfur absorbent.

23. The process of claim 1, wherein the first recycle gas stream is not subjected to a separation stage for removing $H_2S$ and/or $CO_2$, prior to being passed to the hydroprocessing stage.

24. The process of claim 23, wherein the first recycle gas stream is not subjected to a separation stage for removing $NH_3$ and/or CO, prior to being passed to the hydroprocessing stage.

25. The process according to claim 23, wherein in step ii) the separation stage comprises:
ii-1) passing the main hydrotreated stream to a cold separator, for producing said aqueous stream, said hydrogen-rich stream, and a heavy hydrocarbon stream; and
ii-2) passing the heavy hydrocarbon stream to a fractionation section for producing said off-gas stream, and said hydrocarbon product.

26. Plant for producing a hydrocarbon product, comprising:
a hydroprocessing section arranged to receive a feedstock originating from a renewable source and a compressed hydrogen-rich feed stream for producing a main hydrotreated stream;
a separation section arranged to receive said main hydrotreated stream for producing an aqueous stream, a hydrogen-rich stream as a first recycle gas stream, an off-gas stream comprising hydrocarbons as a second recycle stream, and said hydrocarbon product, boiling at above 50° C.;
a separation section for removing $H_2S$ and thereby producing said second recycle gas stream;
a hydrogen producing unit (HPU) arranged to receive said second recycle gas stream and a hydrocarbon feedstock for producing a make-up hydrogen stream;
a compressor section arranged to receive said first recycle gas stream and at least a portion of the make-up hydrogen stream produced in said HPU, for generating said compressed hydrogen-rich feed stream and a make-up hydrogen recycle stream; and
a conduit for passing said first recycle gas stream to said compressor section;
a conduit for passing said make-up hydrogen stream from the HPU to said compressor section.

27. A process for producing a hydrocarbon product, said process comprising the steps of:
i) passing a feedstock originating from a renewable source through a hydroprocessing stage for producing a main hydrotrotreated stream;
ii) passing the main hydrotreated stream to a separation stage for producing:
an aqueous stream,
a hydrogen-rich stream as a first recycle gas stream,
an off-gas stream comprising hydrocarbons,
and said hydrocarbon product, boiling at above 50° C.;
iii) passing the first recycle gas stream to the hydroprocessing stage;
iv) passing the off-gas stream as a second recycle gas stream to a hydrogen producing unit for producing a hydrogen stream as a make-up hydrogen stream; and
v) passing the make-up hydrogen stream to the hydroprocessing stage;
wherein prior to conducting step iv), said off-gas stream passes to a separation stage for removing $H_2S$ and thereby producing said second recycle gas stream;
wherein in step i) the hydroprocessing stage comprises:
i-1) passing the feedstock through a first catalytic hydrotreating unit under the addition of hydrogen for producing a first hydrotreated stream; and
i-2) passing the first hydrotreated stream to a dewaxing section comprising a second catalytic hydrotreating unit under the addition of hydrogen for producing said main hydrotreated stream; and
wherein between step i-1) and i-2) the process further comprises passing the first hydrotreated stream to a separator for removing $H_2S$, $NH_3$, and $H_2O$, thereby producing said first hydrotreated stream.

28. A process for producing a hydrocarbon product, said process comprising the steps of:
i) passing a feedstock originating from a renewable source through a hydroprocessing stage for producing a main hydrotrotreated stream;
ii) passing the main hydrotreated stream to a separation stage for producing:
an aqueous stream,
a hydrogen-rich stream as a first recycle gas stream,
an off-gas stream comprising hydrocarbons,
and said hydrocarbon product, boiling at above 50° C.;
iii) passing the first recycle gas stream to the hydroprocessing stage;
iv) passing the off-gas stream as a second recycle gas stream to a hydrogen producing unit for producing a hydrogen stream as a make-up hydrogen stream; and
v) passing the make-up hydrogen stream to the hydroprocessing stage;

wherein prior to conducting step iv), said off-gas stream passes to a separation stage for removing $H_2S$ and thereby producing said second recycle gas stream;

wherein the first recycle gas stream is not subjected to a separation stage for removing $H_2S$ and/or $CO_2$, prior to being passed to the hydroprocessing stage.

29. The process of claim 28, wherein the first recycle gas stream is not subjected to a separation stage for removing $NH_3$ and/or CO, prior to being passed to the hydroprocessing stage.

30. The process according to claim 28, wherein in step ii) the separation stage comprises:
   ii-1) passing the main hydrotreated stream to a cold separator, for producing said aqueous stream, said hydrogen-rich stream, and a heavy hydrocarbon stream; and
   ii-2) passing the heavy hydrocarbon stream to a fractionation section for producing said off-gas stream, and said hydrocarbon product.

* * * * *